United States Patent
Ebertseder

(10) Patent No.: US 10,682,909 B2
(45) Date of Patent: Jun. 16, 2020

(54) METHOD FOR OPERATING A DRIVE TRAIN OF A MOTOR VEHICLE

(71) Applicant: ZF Friedrichshafen AG, Friedrichshafen (DE)

(72) Inventor: Thomas Ebertseder, Pocking (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/280,496

(22) Filed: Feb. 20, 2019

(65) Prior Publication Data

US 2019/0263261 A1    Aug. 29, 2019

(30) Foreign Application Priority Data

Feb. 27, 2018  (DE) .......................... 10 2018 202 918

(51) Int. Cl.
  *B60W 10/119*  (2012.01)
  *B60W 10/18*   (2012.01)
  (Continued)

(52) U.S. Cl.
  CPC ........ *B60K 23/0808* (2013.01); *B60T 13/588* (2013.01); *B60W 10/026* (2013.01);
  (Continued)

(58) Field of Classification Search
  CPC .... B60W 10/119; B60W 10/14; B60W 10/18; B60W 10/184; B60W 2510/18;
  (Continued)

(56) References Cited

U.S. PATENT DOCUMENTS 3,850,274 A * 11/1974 McLean ................ B60T 11/323
                                                192/221
5,248,020 A    9/1993 Kreitzberg
(Continued)

FOREIGN PATENT DOCUMENTS

DE           69505932 T2    4/1999
DE   10 2012 020 908 A1    5/2014

OTHER PUBLICATIONS

German Search Report issued in corresponding German Patent Application No. 10 2018 202 918.0 dated Dec. 12, 2019.

*Primary Examiner* — Edwin A Young
(74) *Attorney, Agent, or Firm* — Davis & Bujold PLLC; Michael J. Bujold

(57) ABSTRACT

A method of operating a drive-train of a vehicle having a drive engine, at least one drive axle and at least one further axle which can be drivingly connected by a pressure-controlled switching device. The switching device is acted upon by an opening pressure to disconnect the axle. When a service brake system of the vehicle is actuated, the axle is automatically connected by actuating the switching device, which is actuated as a function of a braking mode determined during actuation of the brake system, in such manner that when the brake system is actuated in a first braking mode, the switching device is actuated by a first control pressure to transmit a first torque, and if at least one parameter that characterizes the occurrence of a second braking mode is exceeded, the switching device is actuated by a second control pressure to transmit a second, higher torque.

14 Claims, 4 Drawing Sheets

BRAKING MODES

(51) Int. Cl.
*B60K 23/08* (2006.01)
*B60T 13/58* (2006.01)
*B60W 10/02* (2006.01)

(52) U.S. Cl.
CPC .............. *B60K 2023/0841* (2013.01); *B60K 2023/0858* (2013.01)

(58) Field of Classification Search
CPC ........ B60W 2710/12; B60W 2710/125; B60K 2023/0841; B60K 23/0808
See application file for complete search history.

(56) References Cited

U.S. PATENT DOCUMENTS

| | | | |
|---|---|---|---|
| 5,551,526 A | 9/1996 | Young et al. | |
| 9,352,648 B2 | 5/2016 | Brühl et al. | |
| 2007/0244620 A1* | 10/2007 | Drenth | B60T 8/172 701/81 |
| 2017/0057515 A1* | 3/2017 | Kelly | B60T 8/172 |

* cited by examiner

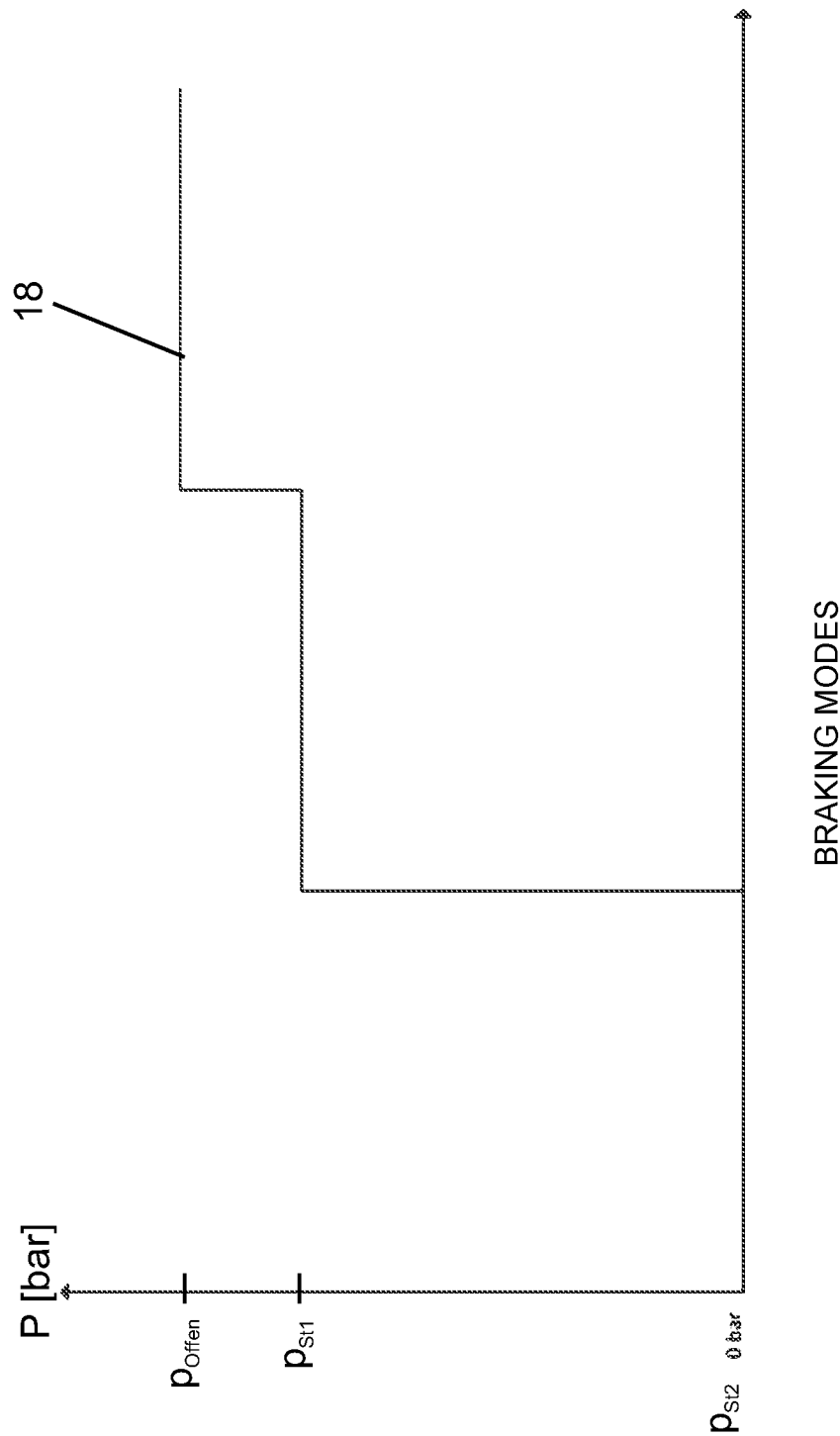

METHOD FOR OPERATING A DRIVE TRAIN OF A MOTOR VEHICLE

This application claims priority from German patent application serial no. 10 2018 202 918.0 filed Feb. 27, 2018.

FIELD OF THE INVENTION

The invention relates to a method for operating a drive-train of a motor vehicle.

BACKGROUND OF THE INVENTION

From DE 10 2012 020 908 A1 a method for operating a drive-train of a motor vehicle is known. The drive-train comprises a drive machine, a manual transmission and a drive axle which can be brought into driving connection with a further axle by a pressure-controlled switching device. The switching to produce a driving connection between the further axle and the drive axle takes place in a driving-situation-dependent manner.

For motor vehicle transmissions, which by actuating the switching device transmit to the connected axle a braking force applied to the drive axle by a brake mechanism, an ambivalent situation arises in which, in order to protect the drive-train, in particular an axe gearbox of the connectable axle, only a specified torque should be transmitted thereto so as to avoid prolonged loading with too high a torque. This conflicts with the legal requirement that in particular with agricultural or municipal motor vehicles the full braking power must be transmitted to the connected axle in order to achieve the required retardation in the event of maximum load and when towing an additional, unbraked trailer. The torque transmitted during this can exceed the specified torque that can be transmitted for long periods to the connected axle without damage, so by virtue of a monitoring logic system the driving connection can be interrupted by the switching device in order to safeguard the axle transmission of the connected axle against overload. This, however, would result in a braking force loss if the motor vehicle could mainly transmit braking forces only by way of the connected axle, particularly due to a dynamic axle load distribution.

SUMMARY OF THE INVENTION

Starting from the above-described prior art, the purpose of the present invention is now to provide a method for operating a drive-train of a motor vehicle, which method is characterized by better control of the drive-train.

From the process-technological standpoint this objective is achieved with the characterizing features specified in the independent claims. From the equipment-technological standpoint the objective is achieved by virtue of the technical features specified in the independent claims. The dependent claims that follow in each case describe advantageous further developments of the invention. In addition the objects of further claims are a computer program product and a data carrier comprising it. Another independent claim and the sub-claims that depend on it relate to a working machine.

According to the invention, in a method for operating a drive-train of a motor vehicle, in particular an agricultural or municipal utility vehicle, with a drive machine, at least one drive axle and at least one further axle which can be switched into or out of driving connection by means of a pressure-controlled switching device, the axle is automatically connected by actuation of the switching device when a service brake of the motor vehicle is actuated. To disconnect the axle the switching device is acted upon by an opening control pressure, so that no torque is transmitted from the drive axle to the axle that can be connected.

Thanks to the automatic connection of the further axle by virtue of the actuation of the service brake system, a braking torque applied to the drive axle by the service brake system is transmitted to the further axle. The service brake system can be operated hydraulically or pneumatically.

In the context of the invention the drive machine is in particular an internal combustion engine which within the drive-train can be connected by way of a motor vehicle transmission and a respective axle transmission of the drive axle concerned and by the switching device to an axle transmission of the connectable axle. The motor vehicle is preferably a municipal or agricultural utility vehicle, in particular such as a tractor.

The invention now makes use of the technical principle that control of the switching device is carried out as a function of a braking mode of the motor vehicle determined during the retardation process, such that when the service brake system is actuated in a first braking mode the switching device is actuated by a first control pressure in order to transmit a first torque and, if at least one parameter that characterizes a second braking mode is exceeded, the switching device is actuated by a second control pressure for transmitting a second, higher torque.

The actuation of the switching device by two different control pressures takes place as a function of recognizing the occurrence of the first or the second braking mode, wherein the first braking mode is understood to mean a retardation process due to the transmission of the first torque to the connected axle, which enables prolonged all-wheel operation without damage. The second braking mode corresponds to an emergency braking operation which necessitates the transmission of the second, maximum torque to the connected axle. In this it can be provided that when the actuation of the service brake system is detected the switching device is at first actuated by the first control pressure, and during the course of the retardation process, with reference to the evaluation of the at least one parameter that characterizes the occurrence of the second braking mode, it is decided whether actuation of the switching device with the second control pressure is necessary.

The switching device is preferably in the form of a powershiftable switching device, in particular a disk clutch. In that case, with the switching device in the form of a clutch it must be distinguished whether in the non-actuated condition it is closed or open. Clutches which are closed in the non-actuated condition are also known as "normally-closed clutches". Clutches which are open in the non-actuated condition are "normally-open clutches". In general a normally-closed clutch is used as the switching device, which in the unpressurized state are held in the closed position by mechanical means such as disk springs. Thus, in the unpressurized state the switching device enables permanent all-wheel operation.

To disconnect the axle, the switching device is actuated by an opening control pressure so that no torque is transmitted to the axle. In the case of the normally-closed clutch the actuation is maintained for as long as the axle remains disconnected, the opening control pressure having a value greater than zero bar. Correspondingly, in the case when the switching device used is a normally-open clutch, this is acted upon by an opening control pressure of zero bar for as long as the axle remains disconnected.

In the context of the invention, the actuation of the service brake system can be detected in particular by observing the switching condition of the brake light switch or switches at the time. If the motor vehicle is an agricultural or municipal utility vehicle in which wheel brakes on the left and right side can be actuated independently of one another in order to increase the maneuverability of the utility vehicle, then the service brake system for activating the function is only regarded as actuated if the wheel brakes on both sides are actuated. In such a case, when observing the brake light switches, the brake light switches for both sides must be turned on. The service brake system can be actuated by an operator who is driving the motor vehicle, or by an assistance system or an autonomous system for driving the motor vehicle.

In a preferred embodiment, to determine the presence or a change of the braking mode, as the characteristic parameter a brake pressure variation applied by the service brake system can be monitored. From the brake pressure variation it can be deduced whether the braking process initiated is a regular braking or an emergency braking operation. In the case of an emergency braking operation there is a sudden increase of the brake pressure variation, which can occur at the beginning of the retardation process or only during the course of the retardation process.

In a preferred further development, to determine the occurrence or change of the braking mode, as the characteristic parameter a speed variation of the vehicle can be monitored. For this, a comparison can be carried out with at least one comparison variation of the speed of the vehicle which is characteristic of an emergency braking operation.

In particular, the actuation of the switching device by the second control pressure can be limited to the duration of the retardation process. By detecting that the motor vehicle is at rest at the end of the retardation process, it can be brought about that the switching device is thereupon controlled by the first control pressure or by the opening pressure. Thus, a subsequent starting process can take place with the axle connected or disconnected.

Furthermore, the first control pressure can be specified as a function of the first torque to be transmitted. The first control pressure can be adapted for various operating conditions of the motor vehicle.

Preferably, during the actuation of the switching device by the first control pressure the rotational speed can be monitored. By monitoring the rotational speed on the output side of the switching device and determining a rotational speed on the input side of the switching device, the occurrence of damage to the switching device in the form of a friction clutch can be prevented in that undesired, prolonged slipping of the clutch linings is avoided. By means of a rotational speed sensor associated with the switching device, the rotational speed on the output side of the friction clutch can be monitored. The rotational speed on the input side can be determined with reference to an existing transmission gear ratio and a transmission input rotational speed produced by the drive machine. If a specifiable rotational speed difference is exceeded, the switching device or friction clutch is deactivated. If the rotational speed difference is exceeded due to a change from the first braking mode to the second braking mode, then no deactivation takes place since an emergency braking operation is assumed to be taking place.

Within a motor vehicle drive-train the method according to the invention is preferably regulated by a control unit, in particular for a switching device. The drive-train comprises a drive input machine, at least one drive axle and at least one further axle which can be brought into driven connection by means of a pressure-controlled switching device, wherein the switching device can be actuated by an opening pressure to disconnect the axle whereas when a service brake system of the motor vehicle is actuated the switching device can be switched on automatically by an actuator. The control unit is designed to actuate the switching device as a function of a braking mode of the motor vehicle determined during the actuation process, and the control unit is designed to detect an actuation of the service brake system and to actuate the switching device in a first braking mode with a first control pressure for the transmission of a first torque, and to detect that at least one parameter that characterizes the occurrence of a second braking mode has been exceeded, and in the second braking mode to actuate the switching device with a second control pressure for transmitting a second, higher torque.

The system according to the invention can be incorporated as a computer program product which, when run on a processor of a control unit, instructs the processor by software means to carry out the associated process steps which are the object of the invention. In this connection the object of the invention also includes a computer-readable medium on which the above-described computer program product is retrievably stored.

The invention also relates to a working machine that comprises a drive machine, at least one drive axle and at least one further axle which can be brought into driven connection or disconnected by means of a pressure-controlled switching device. The working machine according to the invention is characterized in that the working machine also comprises a control unit according to the invention.

In particular, for the provision of an opening pressure and a first control pressure and a second control pressure for actuating the switching device, a valve arrangement can be provided which comprises an electro-hydraulically regulated valve by means of which the first and second control pressures can be set. By virtue of the electro-hydraulic valve the system can be regulated to the three braking modes. For that purpose the control unit that regulates the electrohydraulic valve is control-technologically connected to the service brake system of the working machine.

Alternatively, to provide an opening pressure and a first control pressure a valve arrangement can be provided, which can be acted upon by the opening pressure and the first control pressure and for which a bypass valve is provided in order to produce a second control pressure. The bypass valve can be connected by control-technological means to a control unit of the service brake system. If the occurrence of a second braking mode is recognized because the braking pressure applied by the service brake system has exceeded a threshold value, then by opening the bypass valve the switching device is depressurized. If the braking pressure of the service brake system falls below the threshold value the bypass valve is closed again, so that the first control pressure is applied and the connected axle can be operated to transmit a first torque.

The invention is not limited to the indicated combination of the features of the independent claims or the claims that depend on them. There are in addition possibilities for combining individual features with one another provided that they emerge from the claims, the following description of preferred embodiments of the invention or directly from the drawings. References in the claims to the drawings by the use of indexes are not intended to restrict the protective scope of the claims.

BRIEF DESCRIPTION OF THE DRAWINGS

An advantageous embodiment of the invention, which is explained below, is illustrated in the drawings, which show:

FIG. 4: A variation of control pressures for actuating a switching device.

DETAILED DESCRIPTION OF THE PREFERRED EMBODIMENTS

Figure 1:
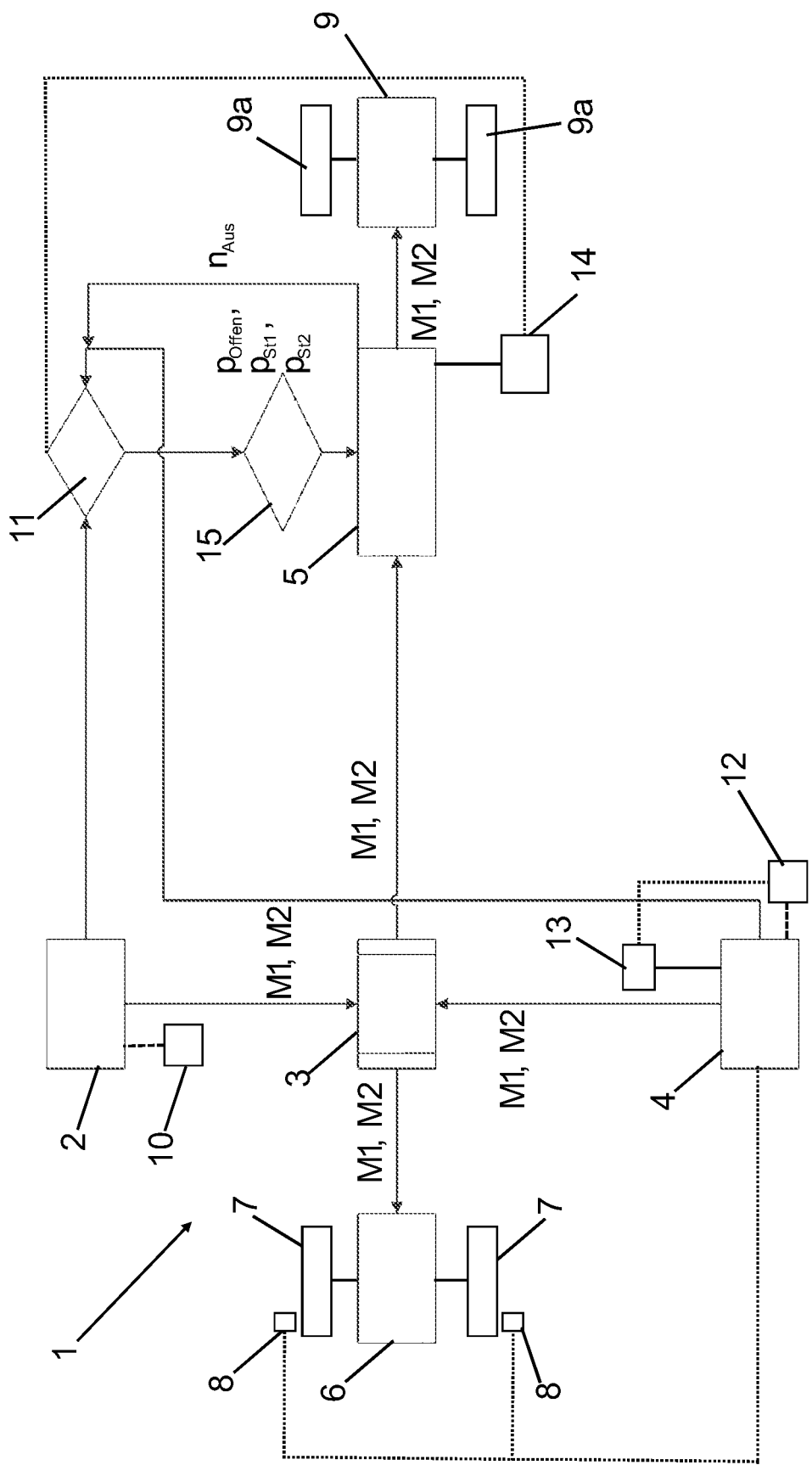
FIG. 1: A schematic view of a drive-train of a motor vehicle.

FIG. 1 shows a schematic view of a drive-train 1 of a motor vehicle, which is preferably an agricultural or municipal utility vehicle and more preferably still a tractor or agricultural motor tractor. The drive-train 1 comprises a drive machine 2 which is in the form of an internal combustion engine and can be connected on a drive output side to a downstream motor vehicle transmission 3. The motor vehicle transmission 3 is in particular a manual gearshift transmission. In addition the drive-train comprises a service brake system 4 that can be connected to the motor vehicle transmission 3.

As can also be seen in FIG. 1, on its drive output side the motor vehicle transmission 3 is connected to an axle transmission (not shown) of a drive axle 6, whereby via the axle transmission a drive input movement of the drive machine 2 geared up or down by the motor vehicle transmission 3 is distributed to two drive wheels 7 of the drive axle 6. Furthermore, on its drive output side the motor vehicle transmission 3 is connected to a pressure-controlled switching device 5 which on its drive output side can be connected to an axle transmission of a further axle 9, which has wheels 9a. The pressure-controlled switching device 5 makes it possible optionally to connect the drive-train 1 only with the drive axle 6 and thus to tow the axle 9, or by drivingly connecting the further axle 9, to operate in the all-wheel mode. For this purpose the switching device 5 is in the form of a friction clutch, in particular a wet-operating disk clutch of the normally-closed type.

With each drive wheel 7 of the drive axle 6 is associated a wheel brake 8 of the service brake system 4 of the motor vehicle, which when actuated selectively brakes the drive wheel 7 concerned, Thus, the drive wheels 7 can also be braked independently of one another in order to increase the maneuverability of the motor vehicle. By connecting the axle 9 by means of the switching device 5 the braking torque transmitted by the service brake system 4 to the drive axle 6 is also transmitted to the axle 9. The actuation of the service brake system or the actuation condition of the two wheel brakes 8 can be checked with reference to the actuation condition of brake light switches.

In each case a control unit 10 or 11 or 12 is associated respectively with the drive machine 2, the motor vehicle transmission 3 and the service brake system 4, which units are connected to and communicate with other control units—not shown further here—via a data bus system of the motor vehicle.

The service brake system 4 comprises a pressure sensor 13 by means of which the braking pressure produced by the service brake system 4 is monitored. The signals provided by the pressure sensor are transmitted to the control unit 12 in order to determine a braking pressure variation therefrom. The signals received and evaluated by the control unit 12 are transmitted to the control unit 11 by way of the data bus system.

Associated with the switching device 5 is a rotational speed sensor 14 which serves for the monitoring of the switching device 5 in the form of a friction clutch. To avoid damaging the friction clutch by prolonged slipping, a rotational speed $n_{Aus}$ detected by the rotational speed sensor 14 on the output side, which is transmitted to the connectable axle 9 by the switching device 5, is sent to the control unit 11 of the motor vehicle transmission 3. An input-side rotational speed at the input of the switching device 5 can be determined by the control unit 11 with reference to the gear ratio of the transmission and the input rotational speed of the transmission. If the rotational speed difference determined by comparing the input-side rotational speed with the output-side rotational speed $n_{Aus}$ exceeds a threshold value, then the engagement of the axle 9 is deactivated in order to avoid damage to the switching device 5 due to slipping.

The activation of the at least one further axle 9 by the switching device 5 takes place automatically when the service brake system 4 is actuated. The service brake system 4 can be actuated by an operator or by an assistance system or an autonomous system for driving the motor vehicle.

The switching device 5 is actuated by the control unit 11 of the motor vehicle transmission 3. For this, the control unit 11 actuates a valve arrangement 15 which provides, respectively for the activation and deactivation of the switching device 5, a necessary first control pressure $p_{St1}$ or an opening pressure $p_{offen}$. To deactivate the axle 9 the switching device 5 is acted upon by the opening pressure $p_{offen}$, i.e. in the case of a normally-closed clutch the opening pressure $p_{offen}$ acts in opposition to a spring force that keeps the switching device 5 closed in the unpressurized condition so that the axle 9 is deactivated, i.e. it is towed. The spring force required for this is applied by a pressure-independent actuator system. Actuation by the first control pressure $p_{St1}$ causes the switching device 5 to close so that a defined first torque $M_1$ that depends on the control pressure $p_{St1}$ can be transmitted by the switching device 5 to the connected axle 9. The order of magnitude of the first torque $M_1$ is chosen such that prolonged all-wheel operation by connecting the axle 9 is possible without damage. The valve arrangement 15 comprises an electro-hydraulically regulated valve such as a proportional valve, which enables adaptation at least of the first control pressure $p_{St1}$.

If a situation arises in which an emergency braking operation is needed, a second torque $M_2$ must be transmitted to the drive axle 6 and the connected axle 9. The second torque $M_2$ is higher than the first torque $M_1$, and corresponds to the maximum torque that can be produced by the service brake system 4. This happens by acting upon the switching device 5 with a second control pressure $p_{St2}$, which is also supplied via the valve arrangement 15.

Figure 2:
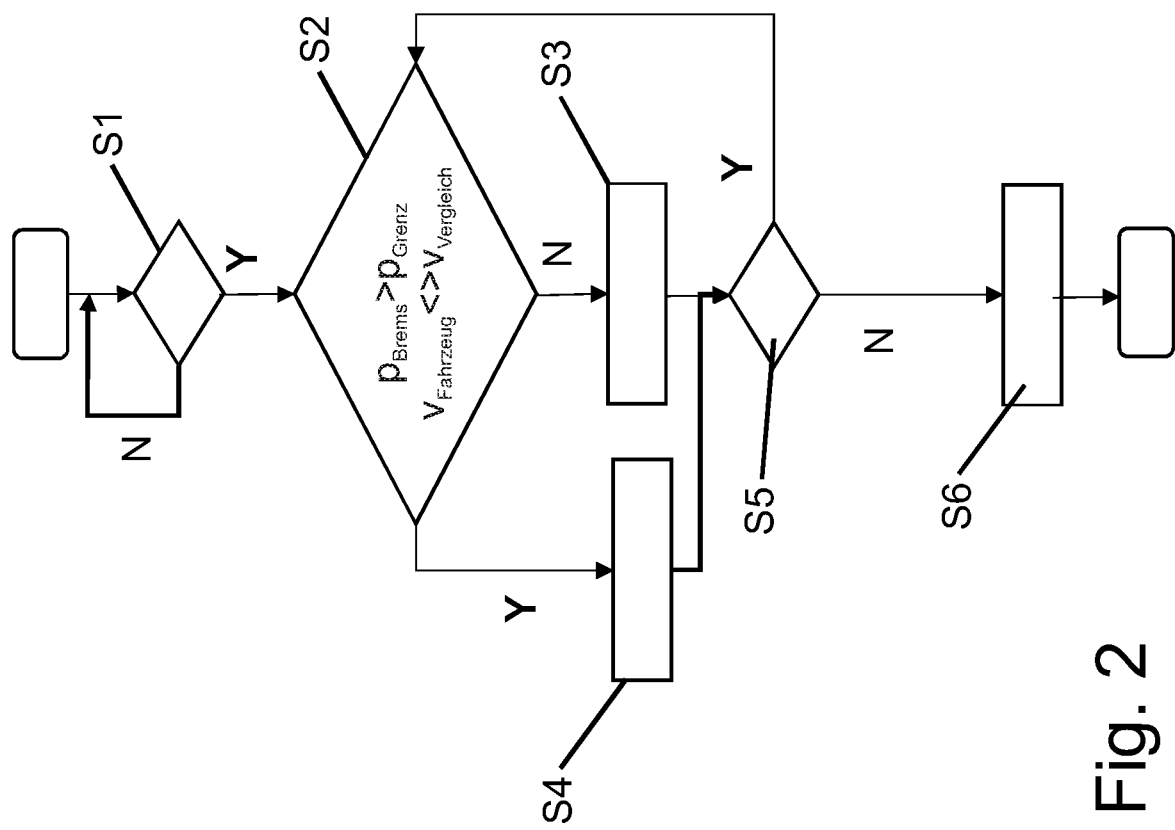
FIG. 2: A flow chart of a method for operating the drive-train of FIG. 1, corresponding to a preferred embodiment of the invention.

As a special feature, the control unit 11 can bring about an automated connection and disconnection of the axle 9 by controlling the switching device 5 as a function of a braking mode of the motor vehicle determined during the actuation of the service brake system 4, in order to brake all the wheels 7, 9a of the motor vehicle during a braking process. For this the control unit 11 controls the switching device 5 in accordance with the process shown in the flow chart of FIG. 2:

At the beginning of the process, in a step S1 it is first questioned whether the service brake system 4 has been actuated. For this, the switch positions of the brake light switches is checked and evaluated. If the service brake system 4 has not been actuated, the process reverts to the beginning and monitoring of the actuation of the service brake system 4 is continued.

In contrast, if the result in step S1 is positive, the process advances to a step S2 in which at least one condition is examined which characterizes the occurrence of a first or a second braking mode. Step S2 distinguished between an ordinary braking operation that corresponds to a first braking mode, and an emergency braking operation that corresponds to a second braking mode. For this the braking pressure $p_{Brems}$ detected by the pressure sensor 13 is compared with a limit value $p_{Grenz}$ which, if exceeded, indicates an emergency braking operation. In addition or alternatively, the actuation of a brake pedal associated with the service brake system 4 can be monitored. By evaluating the displacement path covered when the brake pedal is actuated the type of braking operation, i.e. the braking mode can likewise be concluded. Furthermore the speed variation $v_{Fahrzeug}$ at the time can also be considered in order to be able to conclude the occurrence of the first or the second braking mode. For this the speed variation $v_{Fahrzeug}$ can be compared with a comparison variation $v_{Vergleich}$ of the vehicle speed stored in the control unit, which characterizes the occurrence of an emergency braking operation. Depending on the evaluation in step S2, the process advances to a step S3 or a step 34.

Step S3 is based on the detection of the first braking mode, in which the motor vehicle is slowed normally. In the first braking mode the switching device 5 is acted upon by the first control pressure $p_{St1}$ so that the axle 9 is connected. The control pressure $p_{St1}$ is chosen such that the first torque $M_1$ is transmitted from the drive axle 6 to the connected axle 9, which enables prolonged operation without damage.

If in step S2 it is found that the conditions for the occurrence of the second braking mode are fulfilled, the process advances to step S4. In step 34 the switching device 5 is acted upon by the second control pressure $p_{St2}$ in accordance with the second braking mode. Acting upon the switching device 5 with the second control pressure $p_{St2}$ causes the second torque $M_2$ to be transmitted to the axle 9.

In step S5 it is checked whether the service brake system 4 is still actuated. For this the switch positions of the brake light switches is examined. Likewise, the position of the brake pedal can be taken into account to conclude whether the service brake system 4 is still actuated.

In the case when the braking operation has ended, the system advances to step S6. In contrast, if the service brake system 4 is still actuated, the system reverts to before step S2 in order to determine whether any change of a parameter that characterizes the second braking mode has occurred during the persisting braking process, which leads to a change from the first to the second braking mode. This, for example, can be the case if the operator of the motor vehicle at first brakes in a normal manner but then, because of changing external boundary conditions, an emergency braking operation becomes necessary.

In step S6 the control pressure $p_{St1}$ or $p_{St2}$ active at the time is changed to the opening pressure $p_{Offen}$ so that the torque transmission by the switching device 5 to the axle 9 is cut off. After step S6 the process is ended.

By virtue of the design of the method for operating the drive-train 1 of the motor vehicle according to the invention, during a braking operation it can be ensured that as a function of a braking mode detected the connection of the at least one axle 9 by the switching device 5 takes place in such manner that in a regular braking operation a first torque $M_1$ is transmitted, which enables prolonged all-wheel operation without damage, whereas in the case of an emergency braking operation a second torque $M_2$ is transmitted in order to produce maximum deceleration of the motor vehicle.

Figure 3:
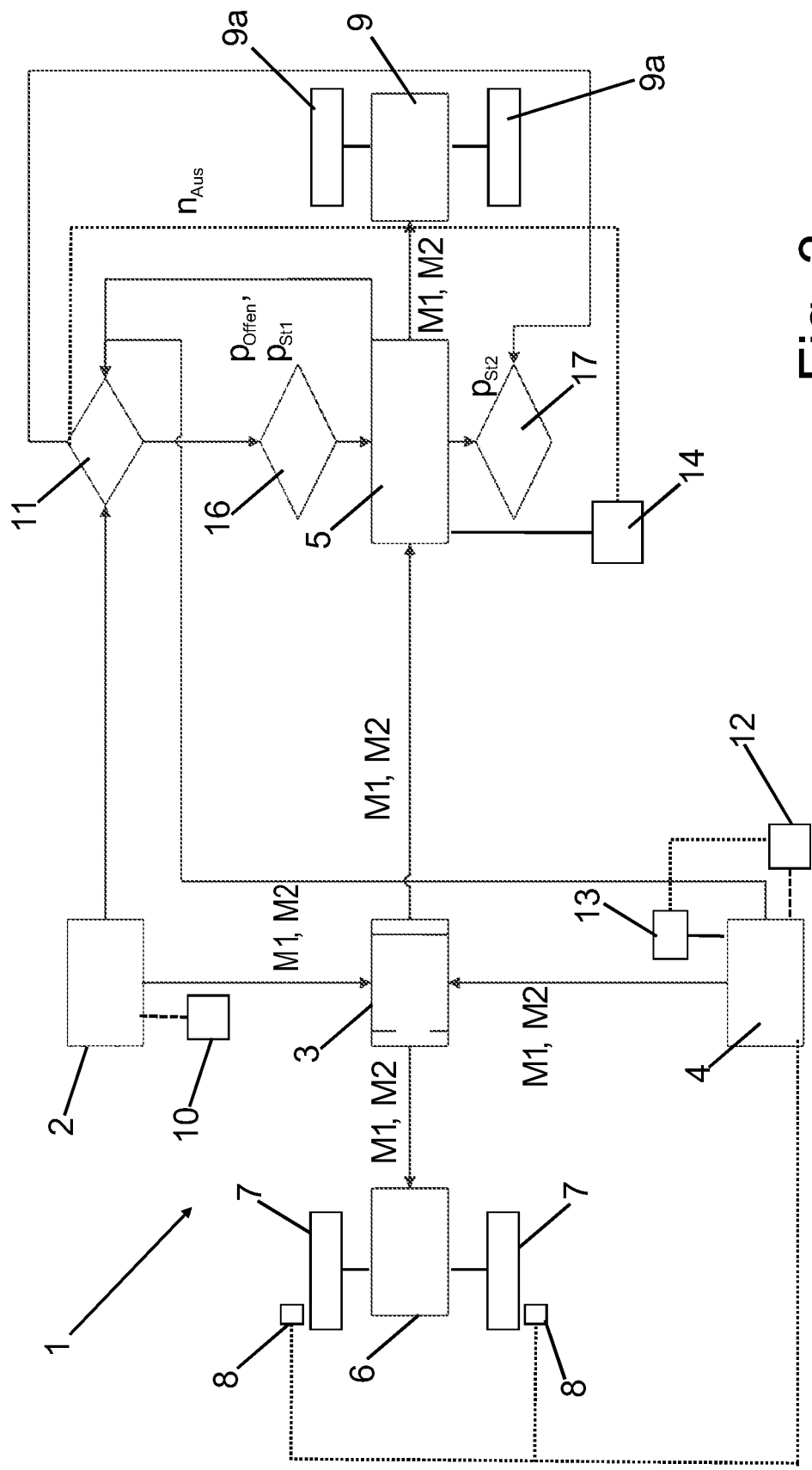
FIG. 3: A schematic view of a drive-train of a motor vehicle according to a second embodiment.

FIG. 3 shows a schematic view of the drive-train 1 of a motor vehicle according to a second embodiment. This second embodiment differs from the embodiment shown in FIG. 1 only by a different actuation of the switching device 5, so the indexes for identical components remain the same. To actuate the switching device a valve arrangement 16 is provided, which comprises hydraulic valves which, respectively, supply one of the control pressures $p_{Offen}$ or $p_{St1}$. The actuation takes place in process steps already explained with reference to the flow chart of FIG. 2. In order to change to the second braking mode in the case of an emergency braking operation, an additional bypass valve 17 is provided which is also controlled by the control unit 11. The opening of the bypass valve depressurizes the switching device so that the switching device 5 is kept closed by the spring force and transmits the second braking torque $M_2$ to the connected axle 9. In this embodiment as well, in accordance with step S2 it is examined whether during the braking process a change from the second braking mode to the first braking mode occurs. In such a case the bypass valve 17 is closed so that the switching device 5 is actuated by the first control pressure $p_{St1}$.

The representation in FIG. 4 shows an exemplary control pressure variation 18 for actuating the switching device 5, which is in the form of a normally-closed clutch. The control pressure $p_{Offen}$ controls the switching device 5 in such manner that if the service brake system 4 is inactive, all-wheel drive is deactivated and the axle 9 is towed. If the service brake system 4 is actuated by an operator or an assistance system and if the evaluation of the characteristic parameter shows that the first braking mode is in force, then the switching device 5 is acted upon by the first control pressure $p_{St1}$. If evaluation of the characteristic parameter shows that the second braking mode is in force or that a change has taken place from the first braking mode to the second braking mode, then the switching device 5 is acted upon by the control unit 11 with the second control pressure $p_{St2}$.

INDEXES

1 Drive-train
2 Drive machine
3 Motor vehicle transmission
4 Service brake system
5 Switching device
6 Drive axle
7 Wheels
8 Wheel brakes
9 Axle
9a Wheels
10 Control unit
11 Control unit
12 Control unit
13 Pressure sensor
14 Rotational speed sensor
15 Valve arrangement
16 Valve arrangement
17 Bypass valve
18 Control pressure variation
$M_1$ First torque
$M_2$ Second torque
$n_{Aus}$ Rotational speed
$p_{Offen}$ Opening pressure $p_{St1}$ First control pressure
$p_{St2}$ Second control pressure
$p_{Brems}$ Braking pressure
$p_{Grenz}$ Limit pressure
$v_{Fahrzeug}$ Speed variation
$v_{Vergleich}$ Comparison speed variation

The invention claimed is:

1. A method of operating a drive-train of a motor vehicle comprising a drive engine, at least one drive axle and at least one further axle which is drivingly connectable by a pressure-controlled switching device, the switching device being acted upon by an opening pressure to disconnect the further axle, and, when a service brake system of the motor vehicle is actuated, the further axle being automatically connected by actuating the switching device, the method comprising:
actuating the switching device as a function of a vehicle braking mode determined during the actuation of the service brake system of the motor vehicle,
when the service brake system is actuated in a first braking mode, actuating the switching device by a first control pressure in order to transmit a first torque, and
actuating the switching device by a second control pressure, if at least one parameter that characterizes an occurrence of a second braking mode is exceeded, in order to transmit a second torque that is higher than the first torque.

2. The method according to claim 1, further comprising monitoring a variation of the braking pressure applied by the service brake system, as the characteristic parameter, to determine the occurrence of, or a change to, the vehicle braking mode.

3. The method according to claim 1, further comprising monitoring a brake pedal value, as the characteristic parameter, to determine the occurrence of, or a change to, the vehicle braking mode.

4. The method according to claim 1, further comprising monitoring a variation of a speed of the vehicle, as the characteristic parameter, to determine the occurrence of, or a change of, the vehicle braking mode.

5. The method according to claim 1, further comprising limiting the actuation of the switching device by the second control pressure to a duration of a retardation process.

6. The method according to claim 1, further comprising specifying the first control pressure as a function of the first torque to be transmitted.

7. The method according to claim 1, further comprising monitoring a rotational speed during the actuation of the switching device by the first control pressure.

8. A control unit for a drive-train of a motor vehicle comprising:
a drive machine,
at least one drive axle,
at least one further axle which is drivingly connectable by a pressure-controlled switching device,
the switching device being actuatable by an opening pressure to disconnect the further axle, and, when a service brake system of the motor vehicle is actuated, the further axle being automatically connectable by actuating the switching device,
the control unit being designed to actuate the switching device as a function of a vehicle braking mode of the motor vehicle determined during an actuation process, the control unit being designed to determine actuation of the service brake system and, in a first braking mode, to actuate the switching device by a first control pressure in order to transmit a first torque, and to detect that at least one parameter hat characterizes an occurrence of a second braking mode being exceeded, and, the control unit, in the second braking mode, actuating the switching device by a second control pressure in order to transmit a second torque that is higher than the first torque.

9. The control unit according to claim 8, wherein the control unit carries out a method of operating the drive-train of the motor vehicle including: actuating the switching device as a function of the vehicle braking mode determined during the actuation of the service brake system of the motor vehicle; when the service brake system is actuated in the first braking mode, actuating the switching device by the first control pressure in order to transmit the first torque; if the at least one parameter that characterizes the occurrence of the second braking mode is exceeded, actuating the switching device by the second control pressure in order to transmit the second torque; and monitoring as the characteristic parameter a variation of the braking pressure applied by the service brake system to determine the occurrence of, or a change to, the vehicle braking mode.

10. The control unit according to claim 8 in combination with a computer program product by which a method of operating the drive-train of the motor vehicle can be carried out with a routine for actuating the switching device is implemented by corresponding control commands stored in a software module, the method including actuating the switching device as a function of the braking mode determined during the actuation of the service brake system of the motor vehicle; when the service brake system is actuated in the first braking mode, actuating the switching device by the first control pressure in order to transmit the first torque; if the at least one parameter that characterizes the occurrence of the second braking mode is exceeded, actuating the switching device by the second control pressure in order to transmit the second torque.

11. A data carrier with the computer program product according to claim 10.

12. A working machine comprising a drive machine, at least one drive axle and at least one further axle which is drivingly connected and disconnected by a pressure-controlled switching device, the working machine comprising a control unit for a drive-train of a motor vehicle having the drive machine, the at least one drive axle and the at least one further axle which is drivingly connected by the pressure-controlled switching device, the switching device being actuatable by an opening pressure to disconnect the further axle , and, when a service brake system of the motor vehicle is actuated, the further axle being automatically connectable by actuating the switching device, the control unit being designed to actuate the switching device as a function of a vehicle braking mode of the motor vehicle determined during an actuation process, the control unit is designed to determine an actuation of the service brake system and, in a first braking mode to actuate the switching device by a first control pressure in order to transmit a first torque, and to detect that at least one parameter that characterizes an occurrence of a second braking mode being exceeded and, in the second braking mode, to actuate the switching device by a second control pressure in order to transmit a second torque that is higher than the first torque.

13. The working machine according to claim 12, wherein a first valve arrangement is provided to supply the opening pressure and the first control pressure and the second control pressure, and the first valve arrangement comprises an electro hydraulically regulated valve by which the first control pressure and second control pressure are regulated.

14. The working machine according to claim 12, wherein a second valve arrangement is provided to supply the opening pressure and the first control pressure, and the second valve arrangement is acted upon by the opening pressure and the first control pressure, and a bypass valve is provided to supply the second control pressure.

\* \* \* \* \*